(12) United States Patent
Kitakata

(10) Patent No.: US 8,231,235 B2
(45) Date of Patent: Jul. 31, 2012

(54) LIGHT HOOD DETACHABLE MECHANISM

(75) Inventor: Masahiko Kitakata, Osaka (JP)

(73) Assignee: Panasonic Corporation, Osaka (JP)

( * ) Notice: Subject to any disclaimer, the term of this patent is extended or adjusted under 35 U.S.C. 154(b) by 375 days.

(21) Appl. No.: 12/554,312

(22) Filed: Sep. 4, 2009

(65) Prior Publication Data

US 2010/0073771 A1 Mar. 25, 2010

(30) Foreign Application Priority Data

Sep. 9, 2008 (JP) .................................. 2008-230796
Sep. 2, 2009 (JP) .................................. 2009-202143

(51) Int. Cl.
*G02B 21/00* (2006.01)
(52) U.S. Cl. .......................... 359/611; 359/511; 359/819
(58) Field of Classification Search .................. 359/511, 359/600–611, 694–706, 819; 396/531, 534
See application file for complete search history.

(56) References Cited

U.S. PATENT DOCUMENTS

| 2,618,201 | A | * | 11/1952 | Brohl et al. | .................... 396/531 |
| 3,698,387 | A | * | 10/1972 | Moore et al. | ................... 600/200 |
| 6,270,266 | B1 | * | 8/2001 | Fukuda et al. | ................. 396/529 |
| 6,967,794 | B2 | * | 11/2005 | Luthardt et al. | ............... 359/827 |
| 2009/0059397 | A1 | * | 3/2009 | Igarashi et al. | ............... 359/818 |

FOREIGN PATENT DOCUMENTS

JP 2008-203683 9/2008

* cited by examiner

*Primary Examiner* — Thong Nguyen
(74) *Attorney, Agent, or Firm* — Hamre, Schumann, Mueller & Larson, P.C.

(57) ABSTRACT

In order to attach a lens hood to a lens body while positioning the lens hood, fixing convex portions are provided on the lens hood and fixing uneven portions are provided on the lens body. On the fixing uneven portion of the lens body, a positioning slope coming into contact with the fixing convex portion of the lens hood upon attachment is provided on a position where a convex portion and a recessed portion are continuously formed on the lens body. Thus it is possible to facilitate attaching and detaching with a simple configuration while obtaining placement accuracy in the circumferential direction of a lens and in a thrust direction.

4 Claims, 5 Drawing Sheets

LIGHT HOOD DETACHABLE MECHANISM

FIELD OF THE INVENTION

The present invention relates to a lens hood attaching/detaching mechanism for detachably attaching a lens hood to an image device such as an integral-type video cassette recorder (hereinafter, will be referred to as a VCR) and a still camera.

BACKGROUND OF THE INVENTION

In the prior art, a lens hood is fixed to the lens body of an image device such as a VCR by a so-called bayonet fixing method in which the lens hood is fit to a mounting member on the side of the lens body (will be referred to as a body-side mounting member) and is rotated by a predetermined angle (for example, see Japanese Patent Laid-Open No. 2008-203683). In the bayonet fixing method, fixing members are provided on the lens hood reliably to fix the lens hood to the lens body. The fixing members are screws that are screwed from the side of the lens hood to press the body-side mounting member with the screw heads, so that the lens hood is fixed to the lens body. Further, double mold (molding with different materials) generally is used for lens hoods. In double mold, a plastic material having high surface hardness is used around the fixed portion of the lens hood to obtain a fixing force upon mounting and an elastomer having low surface hardness is used around the end of the lens hood to obtain safety and absorb an impact.

SUMMARY OF THE INVENTION

However, in the lens hood of the prior art, the lens hood is fixed to the body-side mounting member via the fixing members, so that the number of components increases and results in higher cost. Further, double mold for forming the lens hood also increases the cost. Moreover, since the lens hood is fixed to the body-side mounting member via the fixing members to obtain placement accuracy, it takes some time to attach and detach the lens hood and a photographer may miss the best moment for taking a good picture.

A lens hood attaching/detaching mechanism of the present invention has been devised in view of these problems. An object of the present invention is to reduce the number of materials and components to achieve a simple configuration and facilitate attaching and detaching with placement accuracy.

In order to attain the object, the lens hood attaching/detaching mechanism of the present invention is a lens hood attaching/detaching mechanism for attaching a lens hood to a lens body by fixing and centering the lens hood, including: a hood-side mounting part that is provided on a part of the lens hood so as to be opposed to the lens body and serves as an attached part to the lens body; protrusion receiving portions provided on the hood-side mounting part; hood-side positioning portions provided on the hood-side mounting part; fixing convex portions formed on a surface of the hood-side mounting part so as to be opposed to the lens body; a body-side mounting part that is provided on a surface of the lens body so as to be opposed to the lens hood and serves as an attached part to the lens hood; protrusions that are provided on the body-side mounting part and are fit to the protrusion receiving portions upon attachment; body-side positioning portions provided on the body-side mounting part; introduction recessed portions that are provided on a surface of the body-side mounting part so as to be opposed to the lens hood and allow the fixing convex portions to be introduced into the introduction recessed portions upon attachment; and fixing uneven portions each of which has a convex portion and a recessed portion continuously formed from the introduction recessed portion and has the fixing convex portion brought into contact with a positioning slope continuing to the recessed portion over the convex portion, when the lens hood is rotated relative to the lens body and is positioned by the hood-side positioning portions and the body-side positioning portions in a state in which the fixing convex portions are introduced into the introduction recessed portions upon attachment.

Further, the lens hood attaching/detaching mechanism may include a first body-side positioning portion as the body-side positioning portion; a first hood-side positioning portion as the hood-side positioning portion; a second body-side positioning portion having a phase difference relative to the first body-side positioning portion, at the rear in a rotation direction upon attachment and introduction; and a second hood-side positioning portion having a phase difference relative to the first hood-side positioning portion, at the rear in a rotation direction upon attachment and introduction, wherein the fixing convex portion is positioned in contact with the positioning slope also by the second body-side positioning portion and the second hood-side positioning portion.

Moreover, it is preferable further to provide at least three optical axis positioning convex portions on the inner periphery of the hood-side mounting part.

A lens hood attaching/detaching mechanism of the present invention is a lens hood attaching/detaching mechanism of a lens body to which a lens hood is attached, including: a body-side mounting part that is provided on a surface of the lens body so as to be opposed to the lens hood and has an attached part to the lens hood; protrusions that are provided on the body-side mounting part and fix the lens hood along the optical axis upon attachment; body-side positioning portions provided on the body-side mounting part; introduction recessed portions that are provided on a surface of the body-side mounting part so as to be opposed to the lens hood and allow fixing convex portions provided on the lens hood to be introduced into the introduction recessed portions upon attachment; and fixing uneven portions each of which has a convex portion and a recessed portion continuously formed from the introduction recessed portion and has the fixing convex portion brought into contact with a positioning slope continuing to the recessed portion over the convex portion when the lens hood is attached to the lens body, is rotated, and is positioned.

Further, the lens hood attaching/detaching mechanism may include a first body-side positioning portion as the body-side positioning portion, and a second body-side positioning portion with a phase difference relative to the first body-side positioning portion.

A lens hood attaching/detaching mechanism of the present invention is a lens hood attaching/detaching mechanism of a lens hood attached to a lens body, including: a hood-side mounting part that is provided on a surface of the lens hood so as to be opposed to the lens body and has an attached part to the lens body; protrusion receiving portions that are provided on the hood-side mounting part and are fixed to the lens body along the optical axis upon attachment; hood-side positioning portions provided on the hood-side mounting part; and fixing convex portions that are provided on a surface of the hood-side mounting part so as to be opposed to the lens body and come into contact with positioning slopes when the lens hood is attached to the lens body and is positioned, the positioning slopes being provided on the lens body.

Further, the lens hood attaching/detaching mechanism may include a first hood-side positioning portion as the hood-side positioning portion; and a second hood-side positioning portion with a phase difference relative to the first hood-side positioning portion.

Moreover, the lens hood attaching/detaching mechanism may include at least three optical axis positioning convex portions provided on the inner periphery of the hood-side mounting part.

Further, the lens hood may be made of a single material such as an elastomer.

Thus it is possible to reduce the number of materials and components to achieve a simple configuration and facilitate attaching and detaching with placement accuracy.

DESCRIPTION OF THE EMBODIMENTS

The present invention relates to a lens hood attaching/detaching mechanism for fixing a lens body and a lens hood by fitting the fixing part of the lens hood to the fixing part of the lens body and rotating the lens hood, the mechanism including: at least one fixing convex portion as the fixing part of the lens hood; at least one continuous shape of a recessed portion, a convex portion, and a recessed portion as the fixing part of the lens body; and a positioning slope for limiting the rotation of the lens hood and positioning the lens hood. In such a lens hood attaching/detaching mechanism, first, the lens hood is fit to the lens body such that the fixing convex portions of the lens hood are placed in the recessed portions (introduction recessed portions) of the lens body, and then the lens hood is rotated so as to move the fixing convex portions of the lens hood from the introduction recessed portions to the fixing convex portions of the lens body. Further, the rotation is adjusted by positioning portions and the convex portions of the lens hood are rotated so as to interfere with positioning slopes over the convex portions of the lens body. At this point, the fixing convex portions of the lens hood are brought into contact with the positioning slopes of the fixing convex portions of the lens body while being deformed, and a stress is applied in a direction that prevents a wobble between the lens hood and the lens body, by the restoring forces of the deformed convex portions and the repulsive forces of the positioning slopes. With this configuration, it is possible to obtain placement accuracy in the circumferential direction of a lens and in the thrust direction with a simple configuration and facilitate attaching and detaching.

Moreover, at least three optical axis positioning convex portions are provided at points for attaching the lens body on the inner periphery of the lens hood, and the optical axis positioning convex portions are brought into contact with the outer periphery of the lens body. Thus it is possible easily to position the optical axis and improve placement accuracy along the optical axis. Although the placement accuracy along the optical axis can be improved by the optical axis positioning convex portions alone, placement accuracy can be improved in all directions by providing the fixing portions with the convex portions.

Referring to FIGS. 1 to 6, the best mode for practicing the present invention will be described below.

Figure 1:
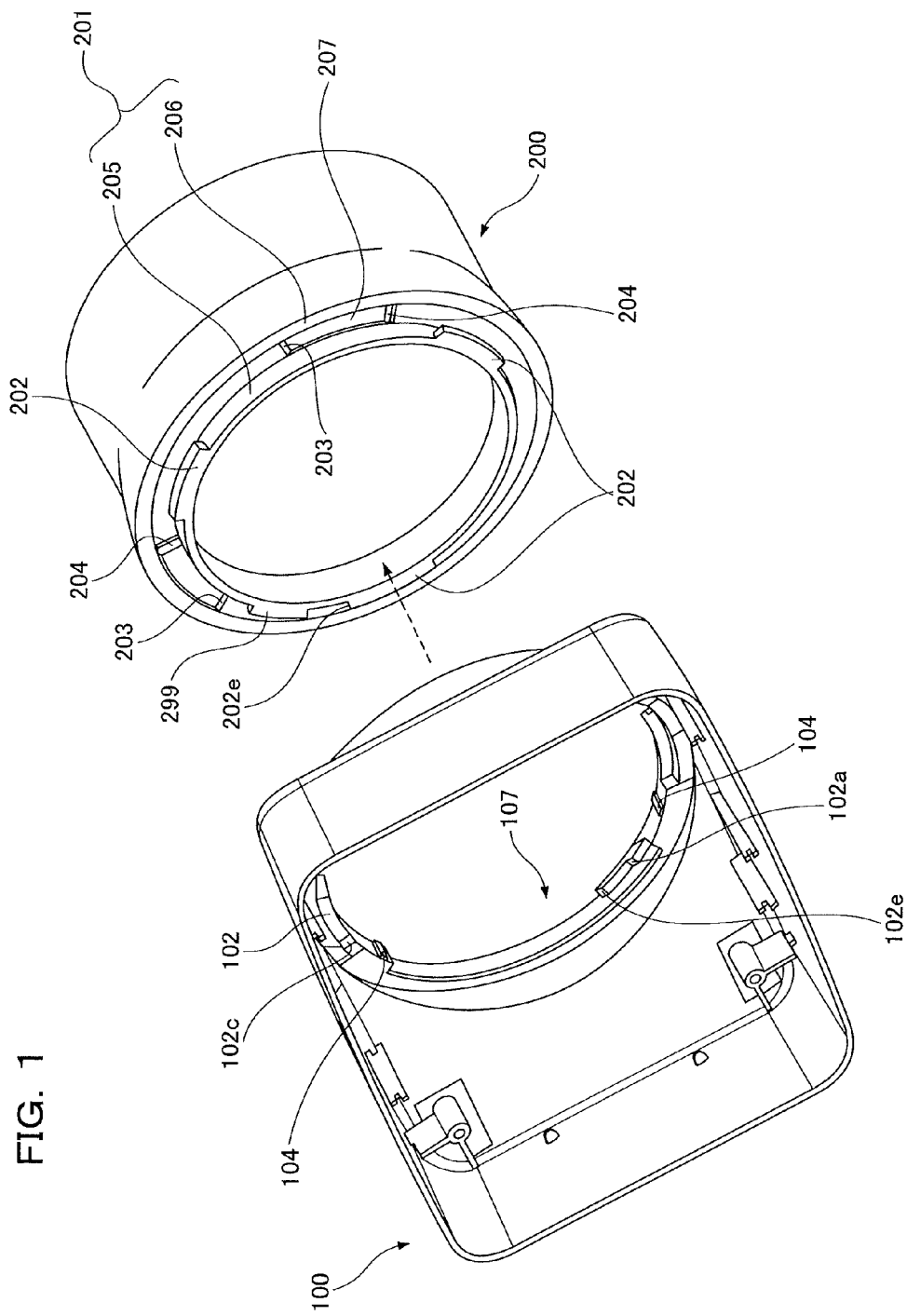
FIG. 1 is an outline perspective view showing a lens body and a lens hood of a lens hood attaching/detaching mechanism according to an embodiment of the present invention.
Figure 2A:
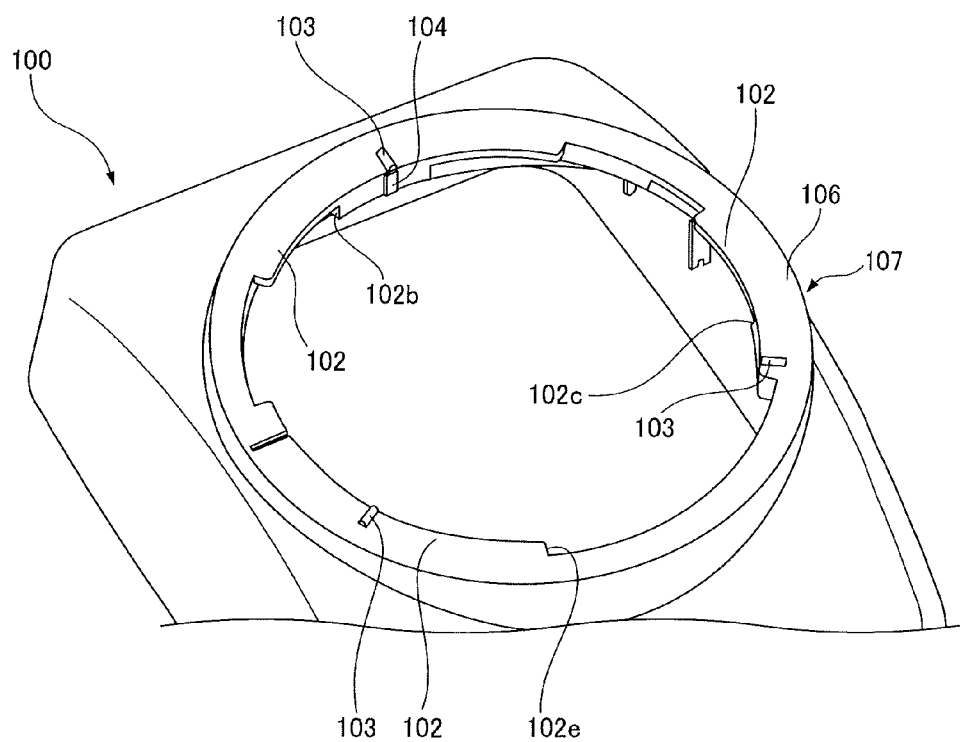
FIG. 2A is a perspective view showing the rear of the lens hood of the lens hood attaching/detaching mechanism.
Figure 2B:
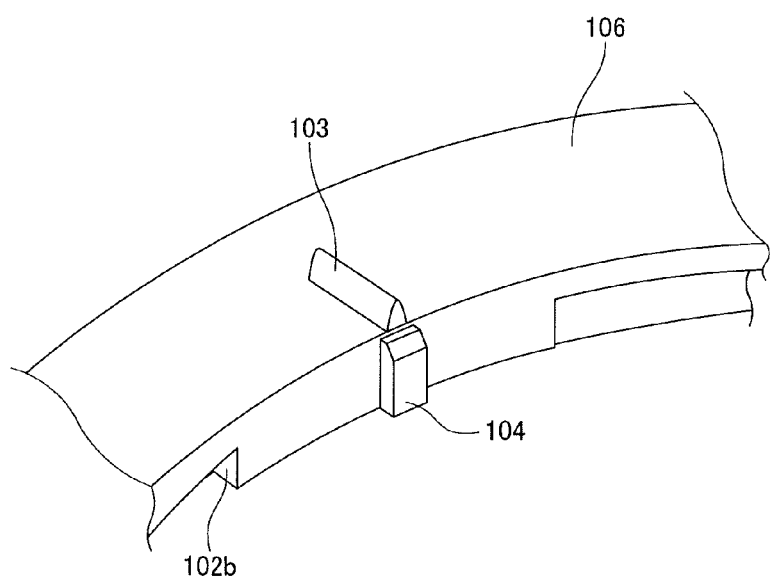
FIG. 2B is an enlarged perspective view showing a main part of the lens hood of FIG. 2A, that is, a point where a fixing convex portion and an optical axis positioning convex portion are provided.
Figure 3A:
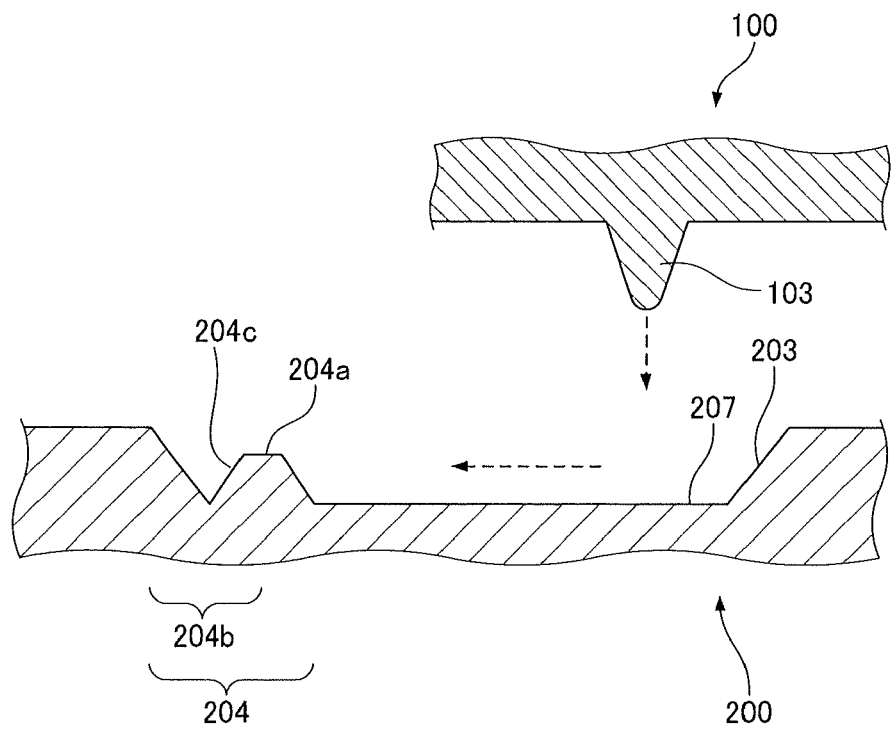
FIG. 3A is an enlarged sectional view showing a main part of the configuration of a fixing part of the lens hood attaching/detaching mechanism.
Figure 3B:
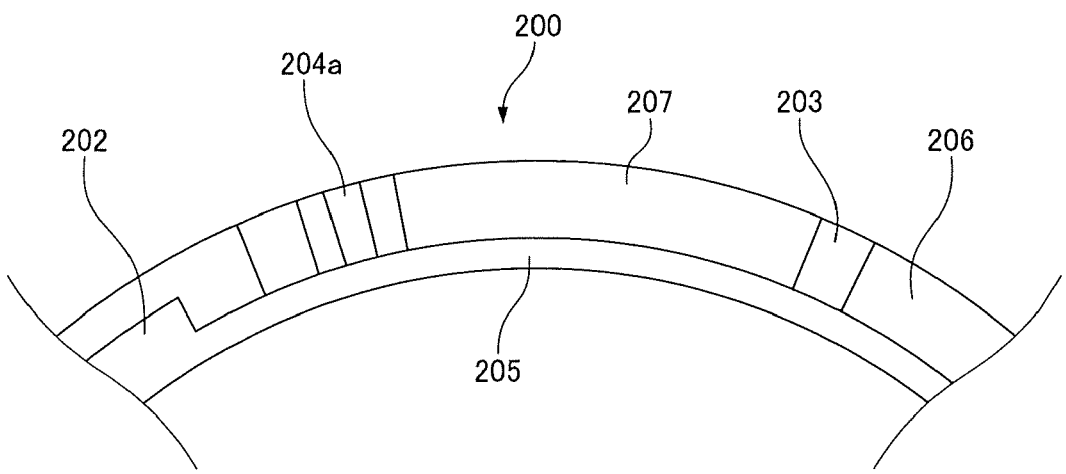
FIG. 3B is an enlarged front view showing a main part of the lens body of the lens hood attaching/detaching mechanism.
Figure 4:
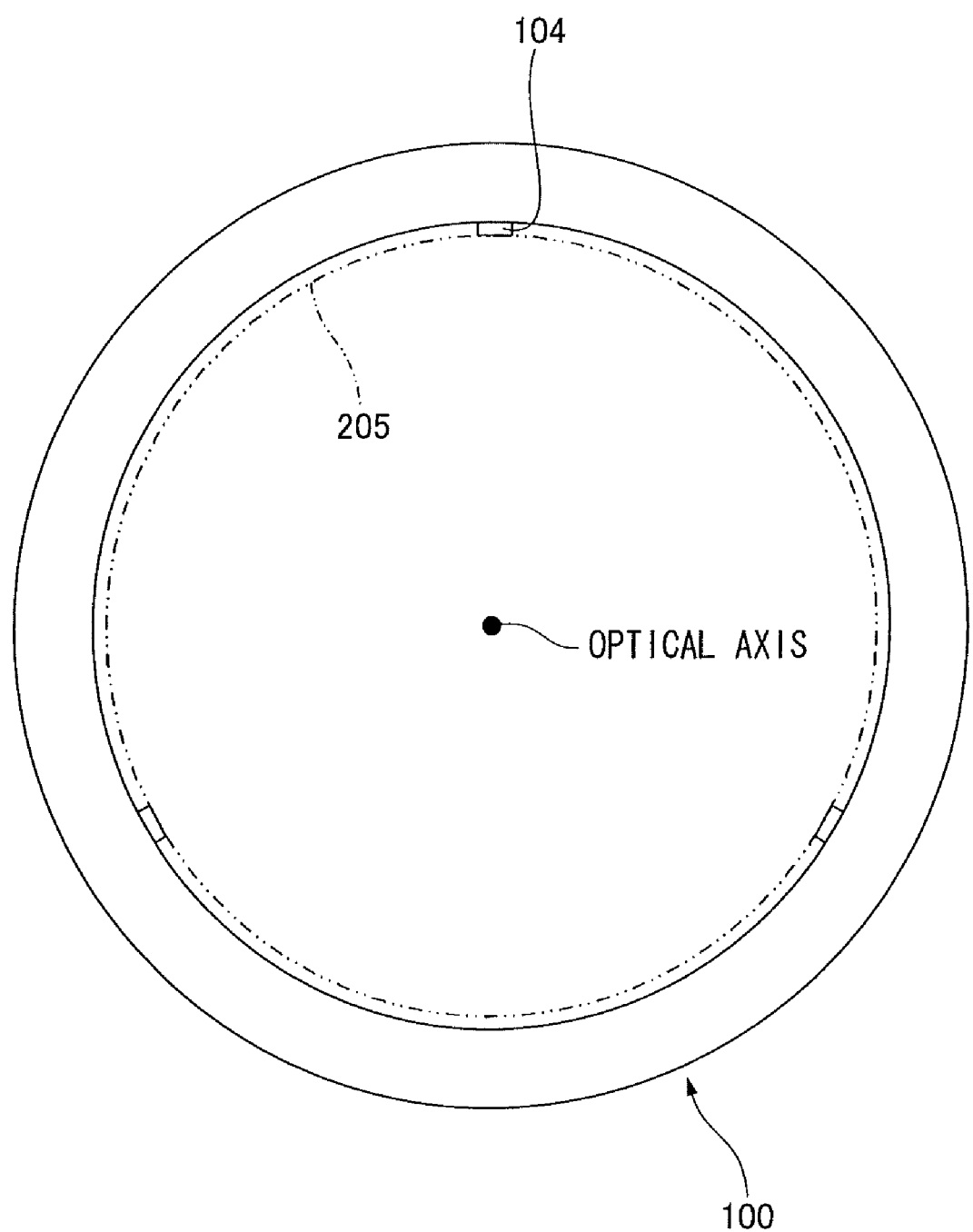
FIG. 4 is an explanatory drawing showing a configuration for positioning along the optical axis of the lens hood attaching/detaching mechanism.

FIG. 1 is an outline view showing a lens body and a lens hood. FIG. 2A is a perspective view showing the rear of the lens hood. FIG. 2B is an enlarged perspective view of a main part of the lens hood of FIG. 2A, that is, a point where a fixing convex portion and an optical axis positioning convex portion are provided. FIGS. 3A and 3B are enlarged views of a main part of the configuration of a fixing part. FIG. 3A is a sectional view of the fixing part and FIG. 3B is a plan view of the fixing part. FIG. 4 is an explanatory drawing showing a configuration for positioning along the optical axis.

As shown in FIGS. 1 to 4, on the front of a lens body 200, that is, on the subject side of the lens body 200, a body-side mounting part 201 is provided that includes a ring cylindrical portion 205 protruding to the front and a lens hood mounting surface 206 provided outside the cylindrical portion 205. A lens hood 100 can be attached and detached to and from the lens body 200 only from a specific phase defined by three protrusions 202 that are protruded to the outside from the outer periphery of the cylindrical portion 205 of the body-side mounting part 201. In the present embodiment, the phase indicates a phase relative to the circumferential direction of the lens body 200, that is, a rotation direction about the optical axis. When viewed from the front, a clockwise direction is a forward direction and a counterclockwise direction is a backward direction.

One of the three protrusions 202 has a first body-side positioning portion 202e which is an end provided in the forward direction and bent to the rear.

On the rear end of the lens hood 100 opposed to the lens body 200, a hood-side mounting part 107 serving as an attached part to the lens body 200 is provided. The hood-side mounting part 107 has a substantially circular hole that is slightly larger than the outside shape of the cylindrical portion 205 of the lens body 200. The lens hood 100 is attached to the lens body 200 by fitting the cylindrical portion 205 into the hole. The inner periphery of the hole has three protrusion receiving portions 102. When the lens hood 100 is attached to the lens body 200 and is rotated, the protrusions 202 and the protrusion receiving portions 102 are fit to each other. The protrusion receiving portions 102 have second hood-side positioning portions 102a, 102b, and 102c, respectively. The second hood-side positioning portions are ends provided in the backward direction and bent to the front. One of the three protrusion receiving portions 102 has a first hood-side positioning portion 102e on the end provided in the forward direction along with the second hood-side positioning portion 102a. In FIG. 1, a fourth protrusion 299 is provided. The protrusion 299 has no corresponding protrusion receiving portion and thus does not particularly act as a protrusion but a guide for attachment in a precise direction. In this explanation, the three pairs of the protrusions 202 and protrusion receiving portions 102 are provided but any number of pairs may be provided as long as fixing along the optical axis is obtained.

As shown in FIG. 4, optical axis positioning convex portions 104 are provided at three points on the inner periphery of the hood-side mounting part 107 of the lens hood 100. The optical axis positioning convex portions 104 are formed such that the optical axis positioning convex portions 104 and the outer periphery of the cylindrical portion 205 of the body-side mounting part 201 are always in contact with each other, so that the lens body 200 and the lens hood 100 can be centered. Thus it is possible to prevent a displacement along the optical axis when the lens hood 100 is attached to the lens body 200. As shown in FIG. 2B, tapers are provided on the rear ends of the optical axis positioning convex portions 104, that is, on an insertion side to the body-side mounting part 201, so that the lens hood 100 can be easily inserted.

On a body-side mounting surface 106 which is the rear surface of the hood-side mounting part 107 of the lens hood 100, fixing convex portions 103 are provided at three points near the optical axis positioning convex portions 104. In order to obtain a fixing force, the fixing convex portions 103 and the optical axis positioning convex portions 104 are provided on portions having high stiffness on the inner periphery of the lens hood 100, that is, on thick portions in the longitudinal direction.

As shown in FIGS. 3A and 3B, on a surface of the body-side mounting part 201 of the lens body 200, an introduction recessed portion 207 is provided so as to be opposed to the lens hood 100. The fixing convex portion 103 is introduced into the introduction recessed portion 207 when the lens hood 100 is attached. On a position advanced from the introduction recessed portion 207 in a rotation direction for attaching the lens hood 100, that is, in the forward direction, a fixing uneven portion 204 is provided in which a convex portion 204a and a recessed portion 204b are continuously formed. Further, on a recessed portion advanced in the backward direction relative to a rotation, an introduction slope 203 is provided for introducing the fixing convex portion 103 when the lens hood 100 is attached. On the body-side mounting surface 206 on the outside of the body-side mounting part 201, a section from the introduction slope 203 to the fixing uneven portion 204 advanced from the introduction slope 203 in the forward direction is recessed to the rear slightly more than the height of the fixing convex portion 103. In this way, the introduction slope 203, the introduction recessed portion 207 including the introduction slope 203, and the fixing uneven portion 204 are formed continuously from the backward direction, so that an uneven part serving as the fixing part of the lens body 200 is formed. Upon attachment, the lens hood 100 is attached to the lens body 200 such that the fixing convex portions 103 are placed in the introduction recessed portions 207 including the introduction slopes 203, and then the lens hood 100 is rotated in the forward direction, so that the fixing convex portions 103 are fixed by the recessed portions 204b of the fixing uneven portions 204.

Figure 5:
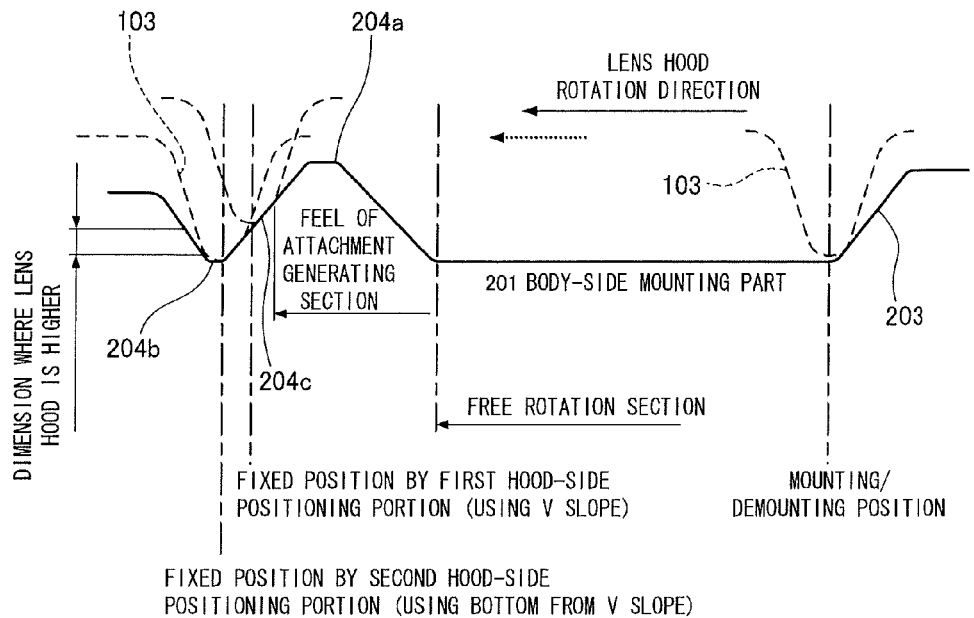
FIG. 5 schematically shows a change of a fit state of the lens hood and the lens body of the lens hood attaching/detaching mechanism.

FIG. 5 schematically shows a change of a fit state of the lens hood 100 and the lens body 200. In FIG. 5, the forward direction of the phase is directed to the left and the forward direction of the optical axis is directed upward. Further, a solid line shows the uneven part of the lens hood mounting surface 206 in the circumferential direction and broken lines show that the fixing convex portion 103 provided on the rear surface of the lens hood 100 is moved with the lens hood rotating in the forward direction.

Referring to FIG. 5, the following roughly will describe a change from the attachment of the lens hood 100 to a rotation to a fixing position for fitting the lens hood 100. The introduction slope 203 of the lens body 200 is provided to improve the convenience of attaching/detaching. When the fixing convex portion 103 on the mounting surface side of the lens hood 100 is inserted to the bottom along the introduction slope 203 and then is rotated in the forward direction, the fixing convex portion 103 is brought into contact with the convex portion 204a of the fixing uneven portion 204 through the introduction recessed portion 207 serving as a rotation introduction section for the fixing convex portion 103. By further rotating the lens hood 100, the fixing convex portion 103 of the lens hood 100 moves over the convex portion 204a of the fixing uneven portion 204 and is fixed by a positioning slope 204c formed on the recessed portion 204b which is shaped like, e.g., a letter V. The convex portion 204a of the fixing uneven portion 204 is trapezoidal and the recessed portion 204b adjacent to the convex portion 204a in the forward direction is shaped like a V groove. The length and height of the flat portion to confirm through a feel of rotation (hereinafter, will be referred to as a feel of attachment) that the fixing convex portion 103 has reached the positioning slope 204c of the recessed portion 204b by rotation. The flat portion is the upper part of the trapezoid of the convex portion 204a.

Figure 6:
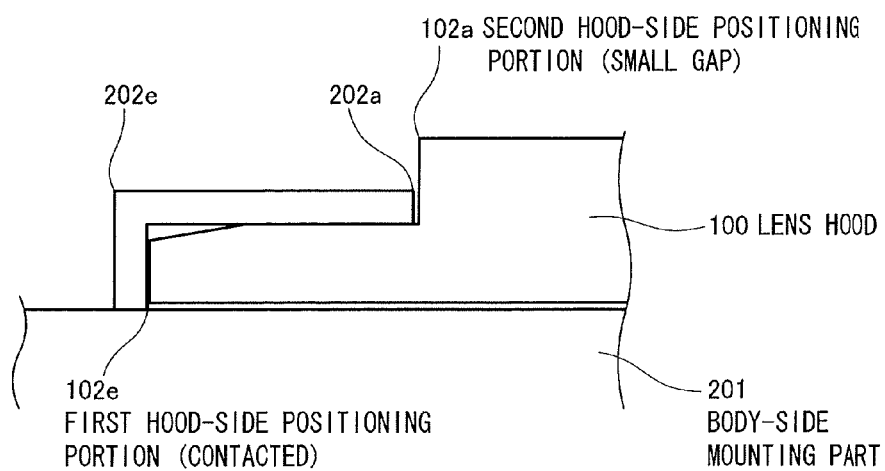
FIG. 6 shows that the lens hood is positioned relative to the lens body of the lens hood attaching/detaching mechanism.

FIG. 6 shows that the lens hood 100 is positioned relative to the lens body 200 by one of the first hood-side positioning portion 102e and the second hood-side positioning portion 102a. FIG. 6 shows from the outside a circumferential cross section of a portion where the protrusion 202 having the first body-side positioning portion 202e out of the protrusions 202 of the lens body 200 is fit to the protrusion receiving portion 102 of the lens hood 100 in a state in which the lens hood 100 is attached to the lens body 200 and then the lens hood 100 is rotated and mounted. In FIG. 6, the forward direction of the phase is directed to the left and the front is directed upward. When the lens hood 100 is attached to the lens body 200 and is rotated, the first hood-side positioning portion 102e of the lens hood 100 is positioned in contact with the first body-side positioning portion 202e of the lens body 200. In a state in which the lens hood 100 is positioned relative to the lens body 200, the phase relationship of the fixing convex portion 103, the fixing uneven portion 204, the first hood-side positioning portion 102e, and the first body-side positioning portion 202e is set such that the fixing convex portion 103 of the lens hood 100 comes into contact with the positioning slope 204c on the side of the convex portion 204a of the recessed portion 204b. Further, the lens hood 100 is made of a single elastomeric material having low surface hardness and the fixing convex portion 103 is made of the same material. Thus the fixing convex portion 103 on the fixing position comes into contact with the positioning slope 204c of the lens body 200 having high surface hardness, and the end of the fixing convex portion 103 is deformed and generates a stress in the forward direction. As a result, by a stress generated in the backward direction by the first hood-side positioning portion 102e and the first body-side positioning portion 202e and a stress generated in the forward direction by the deformation of the fixing convex portion 103, placement accuracy can be obtained in the circumferential direction of a lens and the thrust direction with a simple configuration and the lens hood 100 easily can be attached and detached.

In FIG. 6, in a state in which the first hood-side positioning portion 102e and the first lens-side positioning portion 202e are in contact with each other, a phase difference is made so as to have a small gap between the second hood-side positioning portion 102a and a second lens-side positioning portion 202a.

Moreover, when a rotation is stopped by one of the first hood-side positioning portion 102e and the second hood-side positioning portion 102a, a phase difference is set such that the fixing convex portion 103 comes into contact with the positioning slope 204c in either case. Even when the first hood-side positioning portion 102e is worn or deformed by an increasing number of times of mounting and demounting over an extended period of use, positioning can be performed by the second hood-side positioning portion 102a and thus the fixing convex portion 103 can be fixed to the positioning slope 204c.

A function demanded of the lens hood 100 attached to an image device such as a VCR is to enable attachment by detachably fixing and centering the lens hood 100 in a position range set by the lens hood mounting part 201 of the lens body 200. According to the lens hood attaching/detaching mechanism of the present invention, in order to fix the lens hood 100 to the lens body 200 without using a fixing member such as a screw, the convex and recessed portions are arranged in combination on the contact surfaces and the plurality of positioning portions are provided. Thus the lens hood 100 can be detachably fixed and centered. Moreover, the number of components can be reduced by eliminating a fixing member attached to the lens hood 100. Further, the lens hood 100 is fixed so as to be attached and detached by one-touch rotation, thereby reducing an attaching/detaching time. Moreover, as a material used around the fixing portion, it is not necessary to use a material having different surface hardness from the material of the lens hood 100, eliminating the need for double mold (molding with different materials). Since an elastomer is used around the fixing portion as in the lens hood 100, molding can be performed with a single material and thus an easily attached and detached lens hood 100 can be provided at low cost.

As has been discussed, the first body-side positioning portion 202e and the first hood-side positioning portion 102e allow the fixing convex portion 103 to come into contact with the positioning slope 204c, so that the lens hood 100 can be positioned and fixed to the lens body 200. Further, it is preferable to provide the second body-side positioning portion 202a and the second hood-side positioning portion 102a with a small phase difference at the rear relative to the first body-side positioning portion 202e and the first hood-side positioning portion 102e. Even when the number of times of attaching/detaching increases over an extended period of use and the first hood-side positioning portion 102e is worn and deformed, the lens hood 100 can be positioned and fixed to the lens body 200 by the second body-side positioning portion 202a and the second hood-side positioning portion 102a and the lens hood 100 can be formed easily using a single material such as an elastomer having relatively low surface hardness.

In other words, in order to stabilize the lens hood 100 in a state in which the lens hood 100 is detachably fixed and centered in the predetermined position range of the lens body 200, it is necessary to prevent a wobble upon attachment. Thus the end of the fixing convex portion 103 on the lens hood mounting surface 106 is substantially formed into, for example, a hemisphere, the recessed portion 204b of the fixing uneven portion 204 is formed into a V shape, and a weight always is applied in the circumferential direction of the lens and the thrust direction by bringing the fixing convex portion 103 into contact with the V-shaped positioning slope 204c, thereby preventing a wobble in the circumferential direction of the lens and the thrust direction. On the assumption that the number of times of attaching/detaching increases over an extended period of use and the first hood-side positioning portion 102e is worn and deformed, the second body-side positioning portion 202a and the second hood-side positioning portion 102a have a small phase difference at the rear of the first body-side positioning portion 202e and the first hood-side positioning portion 102e. Thus positioning is performed by the second body-side positioning portion 202a and the second hood-side positioning portion 102a, and the fixing convex portion 103 is received in a range from the V-shaped positioning slope 204c serving as a fixing position on the fixing uneven portion 204 to the bottom of the V shape, thereby achieving stable positioning. It is therefore possible to prevent a wobble in the circumferential direction of the lens and the thrust direction. Further, the end of the fixing convex portion 103, which is fit to the fixing uneven portion 204 of the lens body 200, is substantially formed into a hemisphere and the fixing convex portion 103 is set higher than the V-shaped bottom of the recessed portion 204b relative to the contact surface of the protrusion 202 and the protrusion receiving portion 102. Thus when the fixing convex portion 103 is fit to the V-shaped bottom of the recessed portion 204b of the lens body 200, the protrusion receiving portion 102 always presses the protrusion 202 in the thrust direction, thereby preventing a wobble in the thrust direction. In order to obtain a feel of attachment when the lens hood 100 is fixed, the convex portion 204a of the fixing uneven portion 204 is shaped into a trapezoid and a feel of attachment is obtained using a load for allowing the fixing convex portion 103 (substantially hemispherical) to move over the convex portion 204a of the fixing uneven portion 204, so that the lens hood 100 can be stably fixed with a feel of attachment without causing wobbles.

In the foregoing configuration, generally as for the hardness of the lens body 200 and the lens hood 100, the lens body 200 has, for example, a modulus of flexural rigidity of about 8000 MPa and the lens hood 100 has a modulus of flexural rigidity of about 600 MPa. In the foregoing explanation, the lens hood 100 is made of an elastomer but other materials may be used. The lens hood 100 can be molded with a single material having the necessary softness.

What is claimed is:

1. A lens hood attaching/detaching mechanism for attaching a lens hood to a lens body by fixing and centering the lens hood, comprising:
   a hood-side mounting part that is provided on a part of the lens hood so as to be opposed to the lens body and serves as an attached part to the lens body;
   protrusion receiving portions provided on the hood-side mounting part;
   hood-side positioning portions provided on the hood-side mounting part;
   fixing convex portions formed on a surface of the hood-side mounting part so as to be opposed to the lens body;
   a body-side mounting part that is provided on a surface of the lens body so as to be opposed to the lens hood and serves as an attached part to the lens hood;
   protrusions that are provided on the body-side mounting part and are fit to the protrusion receiving portions upon attachment;
   body-side positioning portions provided on the body-side mounting part;
   introduction recessed portions that are provided on a surface of the body-side mounting part so as to be opposed to the lens hood and allow the fixing convex portions to be introduced into the introduction recessed portions upon attachment; and
   fixing uneven portions, each of which has a convex portion and a recessed portion continuously formed from the introduction recessed portion and has the fixing convex portion brought into contact with a positioning slope continuing to the recessed portion over the convex portion, when the lens hood is rotated relative to the lens body and is positioned by the hood-side positioning portions and the body-side positioning portions in a state in which the fixing convex portions are introduced into the introduction recessed portions upon attachment, the mechanism further comprising:

a first body-side positioning portion as the body-side positioning portion;

a first hood-side positioning portion as the hood-side positioning portion;

a second body-side positioning portion having a phase difference relative to the first body-side positioning portion, at a rear in a rotation direction upon attachment and introduction; and a second hood-side positioning portion having a phase difference relative to the first hood-side positioning portion, at a rear in a rotation direction upon attachment and introduction, wherein the fixing convex portion is positioned in contact with the positioning slope also by the second body-side positioning portion and the second hood-side positioning portion.

2. The lens hood attaching/detaching mechanism according to claim 1, further comprising at least three optical axis positioning convex portions on an inner periphery of the hood-side mounting part.

3. The lens hood attaching/detaching mechanism according to claim 2, wherein the lens hood is made of a single material.

4. The lens hood attaching/detaching mechanism according to claim 1, wherein the lens hood is made of an elastomer.

* * * * *